(No Model.)  3 Sheets—Sheet 1.
W. WILSON.
VALVE GEAR.
No. 327,047.  Patented Sept. 29, 1885.
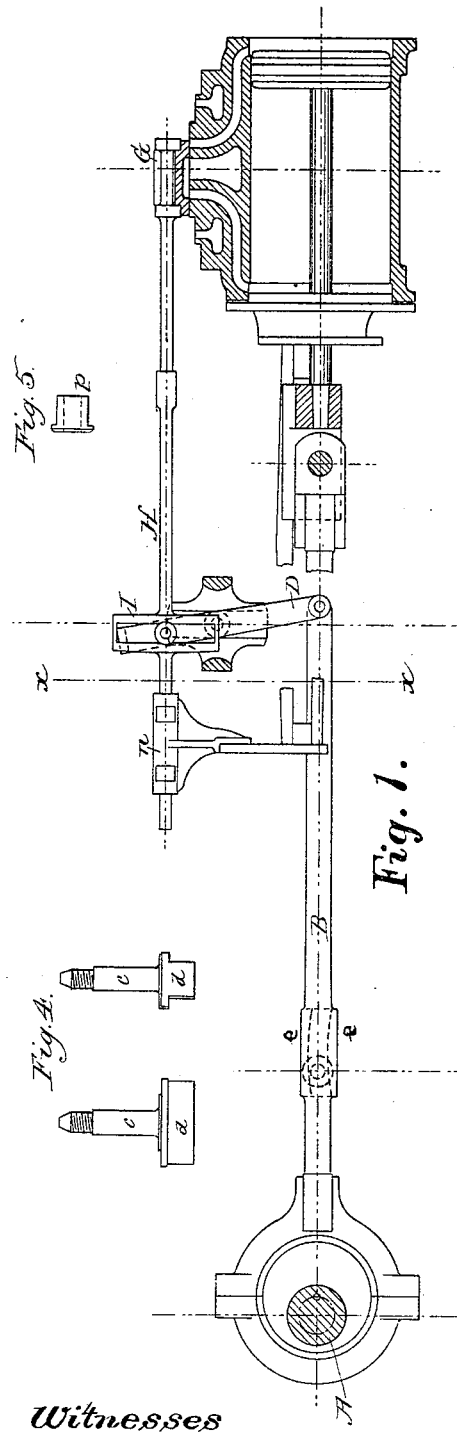
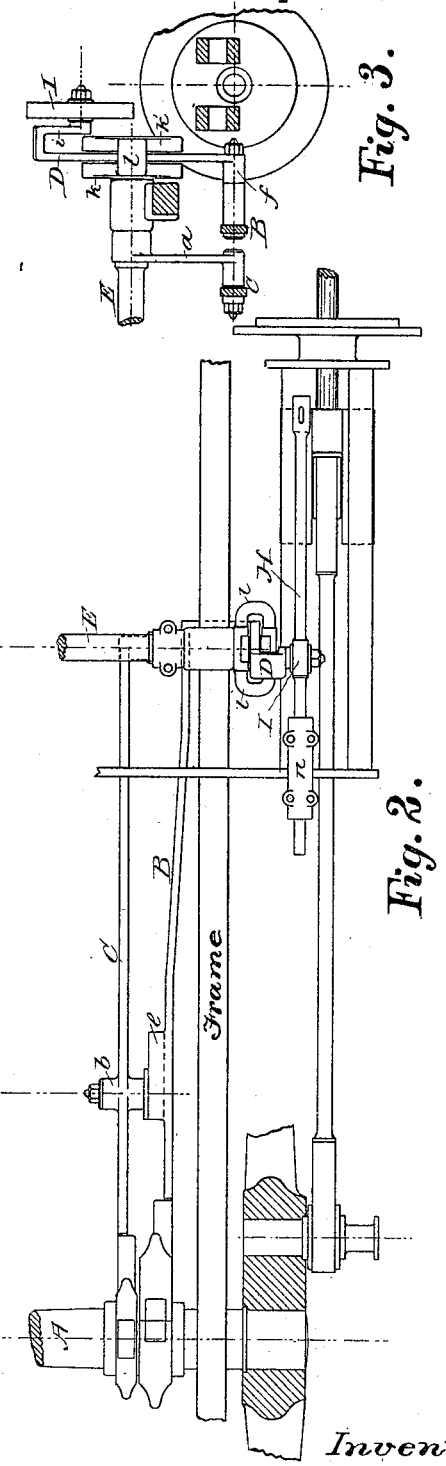
Witnesses
E. A. West
Albert H. Adams
Inventor
Wm Wilson (No Model.)  3 Sheets—Sheet 2.
W. WILSON.
VALVE GEAR.
No. 327,047.  Patented Sept. 29, 1885.
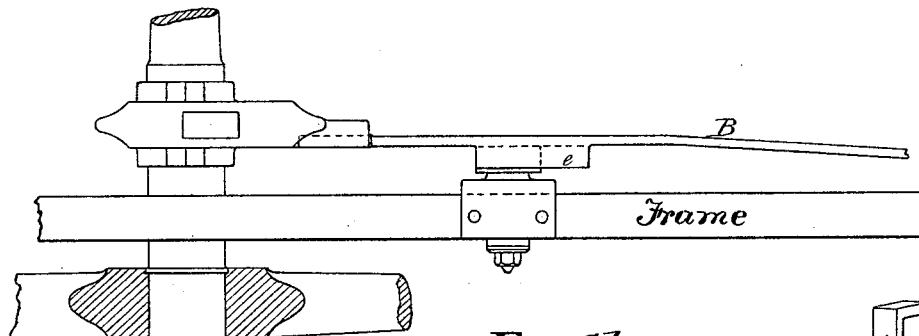
Fig. 11.
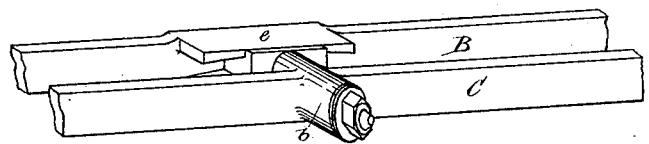
Fig. 6.
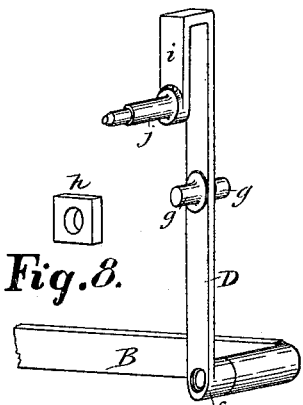
Fig. 8.
Fig. 7.
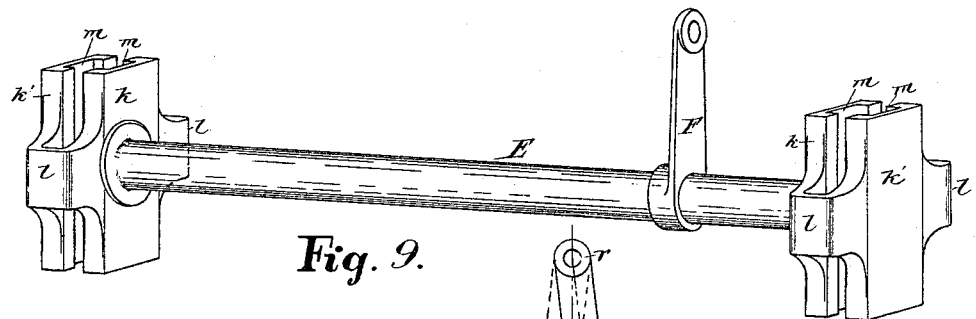
Fig. 9.
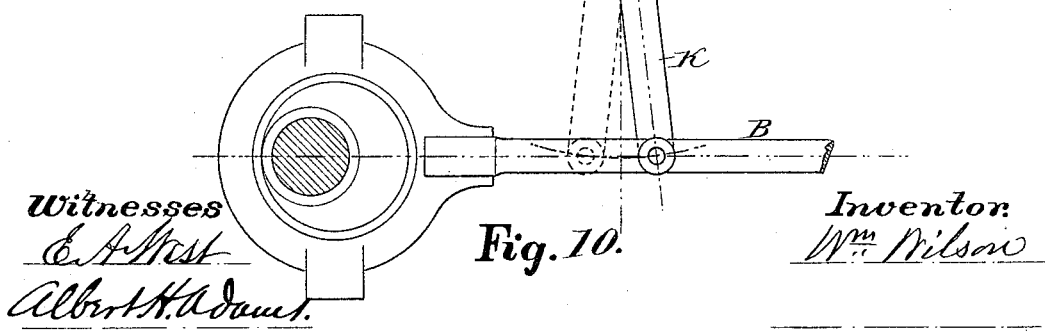
Fig. 10.
Witnesses
E. A. West
Albert H. Adams
Inventor
Wm. Wilson
N. PETERS, Photo-Lithographer, Washington, D. C.

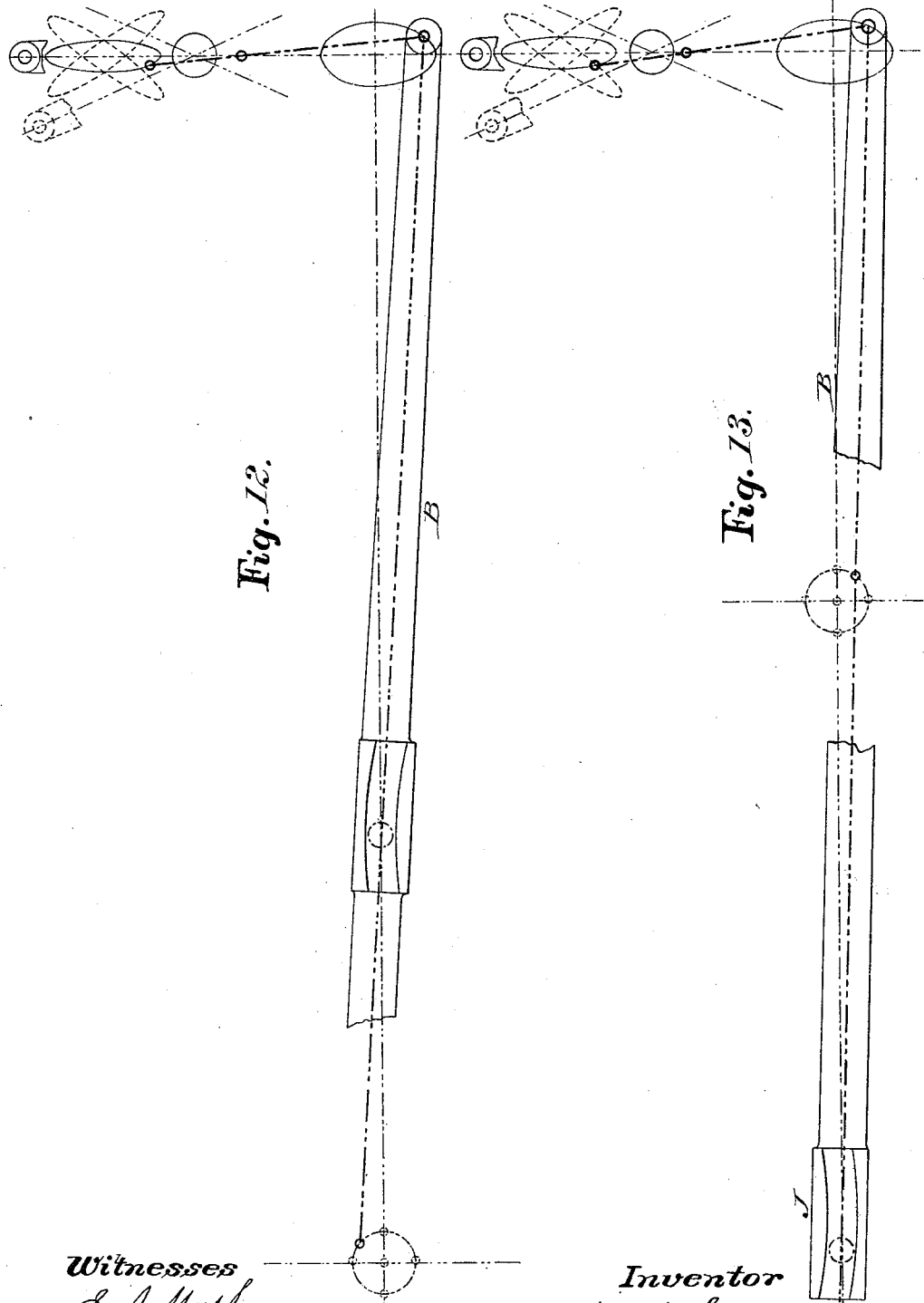

UNITED STATES PATENT OFFICE.

WILLIAM WILSON, OF BLOOMINGTON, ILLINOIS.

VALVE-GEAR.

SPECIFICATION forming part of Letters Patent No. 327,047, dated September 29, 1885.

Application filed May 19, 1885. (No model.)

*To all whom it may concern:*

Be it known that I, WILLIAM WILSON, residing at Bloomington, in the county of McLean and State of Illinois, and a citizen of the United States, have invented a new and useful Improvement in Valve-Gears for Steam-Engines, of which the following is a full description, reference being had to the accompanying drawings, in which—

Figure 1 is a side elevation, some parts being in section. Fig. 2 is a plan. Fig. 3 is a section at line $x$ of Fig. 1, looking to the right. Figs. 4 and 5 are details. Fig. 6 is a detail in perspective. Fig. 7 is a detail in perspective of the left side valve-lever. Fig. 8 is a detail of the guide-block for the valve-lever. Fig. 9 is a perspective of the tumbling-shaft. Fig. 10 is a modification for use in either locomotive or stationary engines. Fig. 11 is a modification for use in stationary engines. Fig. 12 is an illustrative figure showing the paths of the eccentric-lever and valve-lever. Fig. 13 is another illustrative figure.

The leading objects of my invention are to secure a more perfect movement of the valve or valves and to more perfectly regulate their different functions of admission, cut-off, and release, and at the same time maintain a constant lead, giving a better and more economical distribution and release of the steam into and out from the cylinder or cylinders, and to provide devices which will prevent the vertical movement of the axle of a locomotive with which the eccentric is connected from affecting the action of the valve-lever. I accomplish the general object by means of an eccentric or crank placed on or attached to the main shaft or to the axle, (in case of a locomotive,) from which the valve motion is taken, and by causing the eccentric-lever to travel over a fulcrum, so that while a circular motion is imparted to the eccentric-lever at that end which is upon or connected with the shaft or axle the opposite end will move in a path which is oval. To prevent the vertical movement of the axle from affecting the action of the valve-lever, I use, in connection with the said devices, a fulcrum for the eccentric-lever, which has its bearing in a radius-bar arranged as described. I also use other devices, all as illustrated in the accompanying drawings.

I will first describe my improved valve-gear adapted to be used with a locomotive.

In the drawings, A represents the axle.

B is an eccentric-lever connected with the axle and operated thereby, as usual.

C is a radius-bar, one end of which is arranged upon the axle and concentric therewith. The forward end of this bar C is suspended, as shown, from the tumbling-shaft by means of a link or arm, $a$; but it may be hung from any fixed center in any suitable manner.

$b$ is a socket upon the radius-bar C.

$c$ is a pin, which is secured in the socket $b$ by means of a nut. This pin is provided with a shouldered extension, $d$, which serves the purpose of a fulcrum for the lever B. This part $d$ is convex upon one side and concave upon the other. The eccentric-lever is provided with two lips or flanges, $e$, curved on their inner faces to correspond with the curves of the part $d$, over which such flanges are located in use.

D is a valve-lever, which is suitably pivoted at its lower end, $f$, to the eccentric-lever B. This valve-lever D has a fixed pivot, $g$, on each side, as shown in Fig. 7.

$h$ is a block, one being placed on each pivot $g$. The upper end of the lever D is, as shown, bent over upon itself, (see Figs. 3 and 4,) and the return-arm $i$ is provided with a pin, $j$. I use this form so that the lever may have sufficient vertical movement without coming in contact with the upper end of the parts hereinafter described upon the tumbling-shaft.

E is the tumbling-shaft, supported in boxes, as usual. At each end it is provided with the parts $k$ $k'$, which are a little distance apart to allow the lever to move between them, and these parts are connected to each other, as shown at $l$. Each part $k$ $k'$ has a groove, $m$, on the inside, which grooves receive the blocks $h$ on the pivots of the valve-levers. The tumbling-shaft E and parts $k$ $k'$ may be made together.

F is an arm or lever secured to the tumbling-shaft E, by means of which, with other devices, this shaft can be rocked, as usual.

G is a valve, and H is a valve rod, one end of which is supported in a bearing, n, as usual. As shown, (see Fig. 5,) the valve-rod is provided with a slotted link or portion, I, made integral with the rod, in which slotted link is placed the sliding block p, through which block the pin j on the valve-lever passes.

In use the eccentric-lever travels over the fulcrum d, and the circular motion of the lever at one end is converted into an oval motion at the other. The leverage of this lever is also changed by its movement over the fulcrum, and the irregularities due to the angularity of the connecting-rod are corrected, and a uniform movement of the valve-lever is secured, producing a constant lead, equal admission, and cut-off of steam at both ends of the cylinder with equal opening and closing of the exhaust-ports. The axle of the locomotive has a little vertical movement due to the irregularities of the track and other causes, and as the axle rises and falls the radius-bar C moves upon its point of attachment at its forward end as a center, which forward end will always remain in the same horizontal plane, notwithstanding the vertical movement of the axle, and the eccentric-lever being fulcrumed on d, which is secured in the socket in the radius-bar C, the forward end of such eccentric-lever will be held in its proper horizontal plane, and will always move in the same oval path, and will not partake of the vertical movement of the axle, and hence its action on the valve-lever will be uniform.

The blocks h slide up and down in the grooves m, and the valve-lever moves up and down with the blocks, and also moves on its fulcrums g g in the blocks h. At the same time the block p slides up and down in the slotted link i, and the valve-lever operates the valve-rod and valve.

The tumbling-shaft can be partly rotated in its bearings either by a reversing-lever connection or automatically by a governor, as usual; and when the guides k k' are set at an angle the valve-lever will have a lateral as well as vertical motion. The minimum movement of the valve is given when the shaft E is so arranged that the lever-fulcrums move in a vertical line only.

The travel of the valve is increased by causing the fulcrums of the valve-lever to travel in a diagonal line, which can be done by partially rotating the tumbling-shaft, and the direction in which the engine moves is determined by the way in which this shaft is moved.

In Fig. 10 I have shown a modification adapted to be used either with a locomotive or a stationary engine, in which the eccentric-lever is fulcrumed at the lower end of a swinging arm, K, which is suitably pivoted to a fixed point at r. I do not recommend this form, because by it all of the advantages sought cannot be secured.

In Fig. 11 I have shown a modification adapted to stationary engines, in which the fulcrum over which the eccentric-lever travels is secured to any suitable part of the frame, instead of being supported to a movable bar, C, such bar only being required when the axle on which the eccentric is placed has a vertical motion.

In Fig. 12 I have illustrated the path of the forward end of the eccentric-lever, and some of the many paths in which the upper end of the valve-lever may travel, depending on the position of the tumbling-shaft.

Fig. 13 is a similar illustration; but in this figure the fulcrum over which the eccentric-lever travels is located at a suitable distance to one side of the left of the main shaft, instead of between such shaft and the valve-lever, as before described. In this figure such fulcrum is located at J. This fulcrum is supported by a radius-bar or by the frame.

With a stationary engine the lever B may be operated by a crank instead of by an eccentric. A crank might be used for the locomotive; but such construction is not desirable.

The guides on the tumbling-shaft for the valve-lever need not be located at the ends of such shaft, but may be placed at any convenient points.

The eccentric-lever might pass through its fulcrum instead of over it, as described. The change, being very simple, can be easily made without description.

By causing the eccentric-lever to travel over a fulcrum its leverage is changed, and the irregularities due to the angularity of the connecting-rod in use are corrected, and by causing such lever to travel over its fulcrum in the arc of a circle irregularities due to the angularity of the valve-lever are corrected.

What I claim as new, and desire to secure by Letters Patent, is as follows:

1. The combination, in an engine, of an axle, an eccentric-lever, a radius-bar concentrically connected with the axle at one end and pivoted at its other end, and a fulcrum supported in said radius-bar, over which fulcrum the eccentric-lever moves, whereby the vertical movement of the axle will not affect the forward end of the eccentric-lever, but it will constantly travel in the same oval path, substantially as and for the purposes specified.

2. The combination of an eccentric or crank lever, a fulcrum for such lever, a tumbling-shaft provided with guides for the valve-lever, a valve-lever fulcrumed in a sliding block or blocks in the guide, a valve-rod provided with a slotted link, and a sliding block in such link, substantially as and for the purposes specified.

3. The combination of an axle, A, an eccentric or crank lever, B, a radius-bar, C, a fulcrum for the lever supported in the radius-bar, a tumbling-shaft provided with a guide or guides for the valve-lever, a valve-lever fulcrumed in such guide, and a valve-rod, substantially as and for the purposes specified.

4. A tumbling-shaft provided with a guide for the valve-lever, a guide block or blocks, $h$, located in grooves in the guide, a valve-lever fulcrumed in the guide block or blocks $h$, a valve-rod provided with a slotted link, and a sliding block in such link, substantially as and for the purposes specified.

WILLIAM WILSON.

Witnesses:
E. A. WEST,
ALBERT H. ADAMS.